United States Patent
Koylazov

(10) Patent No.: US 9,679,398 B2
(45) Date of Patent: Jun. 13, 2017

(54) RENDERING IMAGES USING COLOR CONTRIBUTION VALUES OF RENDER ELEMENTS

(71) Applicant: Chaos Software Ltd., Sofia (BG)

(72) Inventor: Vladimir Koylazov, Sofia (BG)

(73) Assignee: Chaos Software Ltd., Sofia (BG)

( * ) Notice: Subject to any disclaimer, the term of this patent is extended or adjusted under 35 U.S.C. 154(b) by 0 days.

(21) Appl. No.: 14/886,705

(22) Filed: Oct. 19, 2015

(65) Prior Publication Data

US 2017/0109898 A1 Apr. 20, 2017

(51) Int. Cl.
*G06T 11/00* (2006.01)
*G06T 7/40* (2017.01)
*G06K 9/46* (2006.01)
*G09G 5/02* (2006.01)

(52) U.S. Cl.
CPC .......... *G06T 11/001* (2013.01); *G06K 9/4647* (2013.01); *G06T 7/408* (2013.01); *G09G 5/026* (2013.01); *G09G 2320/0666* (2013.01)

(58) Field of Classification Search
CPC .................................................... G06T 15/50
See application file for complete search history.

(56) References Cited

U.S. PATENT DOCUMENTS

| | | | | |
|---|---|---|---|---|
| 5,063,375 A | * | 11/1991 | Lien | G06T 15/50 345/426 |
| 5,313,568 A | * | 5/1994 | Wallace | G06T 15/55 345/420 |
| 5,412,796 A | * | 5/1995 | Olive | G06T 15/10 434/36 |
| 5,544,283 A | * | 8/1996 | Kaufman | G06T 15/40 345/424 |
| 5,809,219 A | * | 9/1998 | Pearce | G06T 15/50 345/426 |
| 6,226,005 B1 | * | 5/2001 | Laferriere | G06T 15/50 345/426 |
| 6,417,848 B1 | * | 7/2002 | Battle | G06T 1/20 345/419 |
| 6,529,193 B1 | * | 3/2003 | Herken | G06T 15/50 345/426 |
| 6,567,083 B1 | * | 5/2003 | Baum | G06T 15/506 345/426 |

(Continued)

FOREIGN PATENT DOCUMENTS

WO   WO 2006049870 A1 * 5/2006 ............. G06T 15/60

*Primary Examiner* — Jacinta M Crawford
*Assistant Examiner* — Jitesh Patel
(74) *Attorney, Agent, or Firm* — Fish & Richardson P.C.

(57) ABSTRACT

Methods, systems, and apparatus, including computer programs encoded on a computer storage medium, for rendering an image. One of the methods includes, for each of a plurality of pixels of the image: maintaining current color data for each of a plurality of render elements generated by sampling color contribution values for the render element for the pixel; determining, for each of the plurality of render elements, whether or not to sample another color contribution value for the render element from the current color data for the render element for the pixel and the current color data for the render element for one or more pixels that neighbor the pixel in the image; and sampling a new color contribution value only for the render elements for which it was determined to sample another contribution value.

15 Claims, 5 Drawing Sheets

(56) References Cited

U.S. PATENT DOCUMENTS

| | | | | |
|---|---|---|---|---|
| 6,885,370 B2* | 4/2005 | Abramov | G06T 1/20 | 345/426 |
| 7,012,604 B1* | 3/2006 | Christie | G06T 15/06 | 345/426 |
| 7,133,052 B1* | 11/2006 | Silva | G06T 3/0093 | 345/646 |
| 7,265,753 B1* | 9/2007 | Zareski | G06T 15/506 | 345/419 |
| 2001/0045956 A1* | 11/2001 | Hurley | G06T 15/506 | 345/582 |
| 2004/0100465 A1* | 5/2004 | Stowe | G06T 15/00 | 345/427 |
| 2004/0114794 A1* | 6/2004 | Vlasic | G06T 15/205 | 382/154 |
| 2006/0202941 A1* | 9/2006 | Morein | G06T 15/005 | 345/102 |
| 2007/0046686 A1* | 3/2007 | Keller | G06F 17/10 | 345/581 |
| 2007/0057968 A1* | 3/2007 | Fossum | G06T 15/20 | 345/623 |
| 2008/0074420 A1* | 3/2008 | Kuesel | G06T 15/06 | 345/426 |
| 2008/0143720 A1* | 6/2008 | Elmquist | G06T 15/50 | 345/426 |
| 2008/0174600 A1* | 7/2008 | Xie | G06T 15/60 | 345/426 |
| 2009/0033653 A1* | 2/2009 | Brown | G06T 15/06 | 345/419 |
| 2009/0102844 A1* | 4/2009 | Deparis | G06T 15/50 | 345/426 |
| 2009/0254293 A1* | 10/2009 | Tartaglia | G06T 15/50 | 702/85 |
| 2010/0060640 A1* | 3/2010 | Melikian | G06T 15/20 | 345/427 |
| 2010/0073369 A1* | 3/2010 | McCombe | G06T 15/80 | 345/426 |
| 2010/0302245 A1* | 12/2010 | Best | G06T 15/06 | 345/426 |
| 2010/0328310 A1* | 12/2010 | Peterson | G06T 15/06 | 345/426 |
| 2011/0181613 A1* | 7/2011 | Peterson | G06T 15/06 | 345/589 |
| 2012/0075303 A1* | 3/2012 | Johnsson | G06T 15/06 | 345/421 |
| 2014/0098098 A1* | 4/2014 | Chauvier | G06T 15/50 | 345/426 |
| 2014/0146049 A1* | 5/2014 | Ozdas | G06T 15/06 | 345/426 |
| 2016/0071309 A1* | 3/2016 | Shin | G06T 15/06 | 345/426 |
| 2016/0098820 A1* | 4/2016 | Rousselle | G06T 5/002 | 345/426 |

* cited by examiner

RENDERING IMAGES USING COLOR CONTRIBUTION VALUES OF RENDER ELEMENTS

BACKGROUND

This specification relates to rendering computer graphics (CG) images.

During the process of rendering a CG image, multiple factors may contribute to the final color of any given pixel of the image. Due to this, some rendering systems that exist determine the final color of a given pixel in the image by combining color contributions resulting from each of the multiple factors.

SUMMARY

In general, one innovative aspect of the subject matter described in this specification can be embodied in methods for rendering an image that include the actions of, for each of a plurality of pixels of the image: maintaining current color data for each of a plurality of render elements generated by sampling color contribution values for the render element for the pixel; determining, for each of the plurality of render elements, whether or not to sample another color contribution value for the render element from the current color data for the render element for the pixel and the current color data for the render element for one or more pixels that neighbor the pixel in the image; and sampling a new color contribution value only for the render elements for which it was determined to sample another contribution value.

Other implementations of this and other aspects include corresponding systems, apparatus, and computer programs, configured to perform the actions of the methods, encoded on computer storage devices. A system of one or more computers can be so configured by virtue of software, firmware, hardware, or a combination of them installed on the system that in operation cause the system to perform the actions. One or more computer programs can be so configured by virtue of having instructions that, when executed by data processing apparatus, cause the apparatus to perform the actions.

Particular embodiments of the subject matter described in this specification can be implemented so as to realize one or more of the following advantages. The amount of computation necessary to render an image having a desired quality level can be reduced. In particular, by determining whether or not to sample another contribution value at the level of individual render elements rather than at a total current color for a given pixel, unnecessary computation for sampling contribution values for render elements that already meet a desired quality threshold can be avoided. Thus, an image can be rendered quicker and using fewer computing resources.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
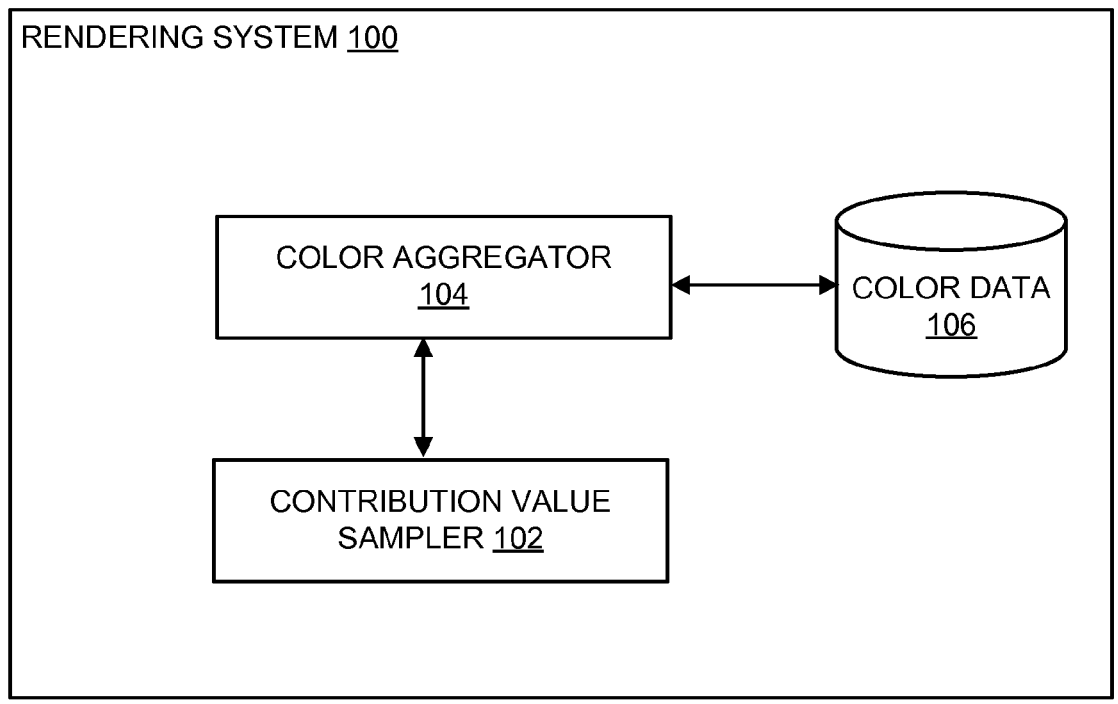
FIG. 1 is a high-level illustration of an example rendering system.

FIG. 1 is a high-level illustration of an example rendering system 100. The rendering system 100 is an example of a system implemented as computer programs on one or more computers in one or more locations, in which the systems, components, and techniques described below are implemented.

Generally, the rendering system 100 generates images or animations from a prepared scene, e.g., based on models or other rendering criteria. For example, the rendering system 100 may receive user data that specifies rendering criteria, e.g., a model to be used in generating a particular scene, and may render a computer graphics (CG) image from the user data.

In particular, the rendering system 100 includes a contribution value sampler 102 and a color aggregator 104.

The contribution value sampler 102 samples color contribution values for each render element in a set of render elements that are to be used to determine the final color of the pixels in an image. The set of render elements may be predetermined, may be specified by a user along with a request to render particular data into an image, or may be specified to the rendering system 100 in a different manner. Generally, each render element for a given pixel is a value or set of values that represents some information about the rendered scene at that pixel. For example, a render element can represent the contribution of a particular type of color calculation to the final color value for the pixel. For example, the set of render elements that represents the contribution of a color calculation to the final color value for the pixel may include values that represent the contribution of one or more of: direct illumination, reflection, indirect illumination, refraction, or volumetric effects.

For a given render element, the contribution value sampler 102 samples a color contribution value for pixels of the image for the render element using conventional rendering techniques. For example, the conventional rendering technique may be a technique that traces rays from the camera into the scene and performs path tracing. In some implementations, the contribution value sampler 102 transmits a request to a different component that performs the sampling and transmits the results of the sampling to the contribution value sampler 102.

The color aggregator 104 aggregates the color contribution values sampled by the contribution value sampler 102 into a final color for each pixel of the rendered image. In particular, during the rendering of a particular scene or other image, the color aggregator 104 maintains color data in a color data store 106 and uses the color data to determine how many color contribution values should be sampled for each of the render elements for each of the pixels in the image.

Determining whether color contribution values should be sampled for a given pixel is described in more detail below with reference to FIGS. 2, 3, 4 and 5.

If additional color contribution values should be sampled for any of the render elements for the pixel, the color aggregator 104 causes the contribution value sampler 102 to sample new color contribution values for the render elements for the pixel. Once no more color contribution values should be sampled for any of the render elements for the pixel, the color aggregator 104 computes a final color for the pixel from the color contribution values sampled for the pixel. Computing the final color for a pixel is described in more detail below with reference to FIG. 2.

Figure 2:
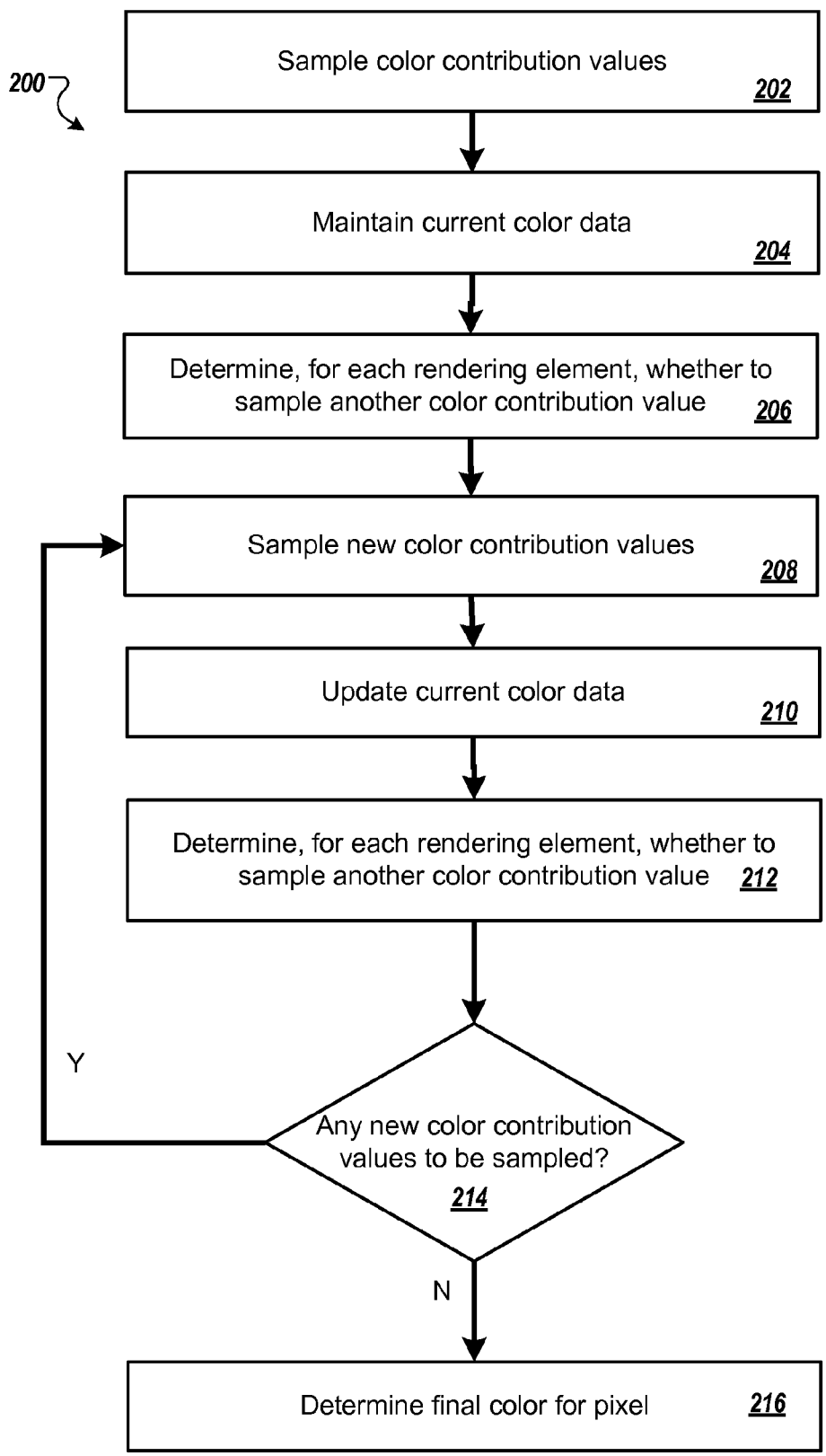
FIG. 2 is a flow diagram of an example technique for determining a final color for a pixel of an image from color contribution values for render elements.

FIG. 2 is a flow diagram of an example technique 200 for determining a final color for a pixel of an image from color contribution values for render elements. For convenience, the technique 200 will be described as being performed by a system of one or more data processing apparatus located in one or more locations. For example, a rendering system, e.g., the rendering system 100 of FIG. 1, appropriately programmed, can perform the technique 200.

The system obtains samples one or more sampled color contribution values for each render element for the pixel, i.e., samples the color contribution values using conventional techniques or receives sampled color contribution values for each render element for the pixel (step 202).

The system maintains current color data for each of the render elements for the pixel (step 204). Generally, the current color data that is maintained for a given render element includes the average of the color contribution values that have been sampled for the render element and the number of samples that have been sampled for the render element. As will be described in more detail below, in various implementations, the current color data also includes other data computed from the color contribution values sampled for the render element.

The system determines, for each render element, whether to sample another color contribution value for the render element from the current color data for the render element and for one or more pixels neighboring the pixel in the image (step 206).

In some implementations, for a pixel that is not adjacent to the image border, the pixels neighboring the pixels in the image are the eight pixels adjacent to the pixel in the image. For pixels that are on the image border but not in a corner of the image, the neighboring pixels are the five pixels that are adjacent to the pixel in the image. For pixels that are in the corner of the image, the neighboring pixels are the three pixels that are adjacent to the pixel in the image. However, other schemes for designating pixels as neighboring a given pixel are possible. For example, the neighboring pixels may be each pixel that is within a specified pixel radius of the given pixel in the image.

Determining whether to sample another color contribution value for a given render element of a given pixel is described in more detail below with reference to FIGS. 3-5.

The system obtains new sampled color contribution values for the render elements for which the system determined to sample another color contribution value and does not sample new color contribution values for the render elements for which the system determined not to sample another color contribution value (step 208). That is, the system samples new color contribution values only for the render elements for which the system determined to sample another color contribution value or requests another component to sample new color contribution values only for the render elements for which the system determined to sample another color contribution value.

The system updates the maintained current color data using the new color contribution values (step 210). That is, for each render element for which a new color contribution value was sampled, the system computes new color data and updates the maintained data with the new color data. For each render element for which no new color contribution value was sampled, the system maintains the same color data.

The system determines, for each render element, whether to sample another color contribution value for the render element from the updated color data for the render element for the pixel and for one or more pixels neighboring the pixel in the image, i.e., as described above with reference to step 206 (step 212).

The system determines whether there are any color contribution values to be sampled for the pixel (step 214). That is, the system determines whether another color contribution value is to be sampled for any of the render elements.

If one or more color contribution values are to be sampled, the technique returns to step 208.

If no color contribution values are to be sampled, the system determines the final color for the pixel (step 216). To determine the final color, the system computes, for each render element, the average of the color contribution values that were sampled for the render element. The system then computes the final color by summing the average color contribution values for the render elements.

In some implementations, once no more color contribution values are to be sampled for the pixel, the system may continue to check whether to sample another color contribution value for each render element whenever new color contribution values are sampled for one or more pixels neighboring the pixel in the image, i.e., because the sampling for a pixel can be resumed if color contribution values for neighboring pixels change significantly. In these implementations, the system can only determine the final color for the pixel once no more color contribution values are to be sampled for any pixel in the image or for any pixel in a region of the image that includes the pixel.

The system performs the technique 200 for each pixel in the image to determine final color values for each pixel in the image. In some implementations, the system performs the technique 200 in parallel for each pixel in the image, i.e., the system determines, for each pixel, which render elements to sample, and then samples for all pixels for the determined render elements. In some other implementations, the system divides the image into multiple regions and then, for each region, performs the technique 200 in parallel for each pixel in the region independently of the pixels in the other regions. Additionally, in some implementations, the system may determine, for each pixel in the image or in a given region of the image, which render elements to sample, if any, and then perform steps 208 and 210 multiple times before performing step 212 to determine whether to sample additional color contribution values.

In some implementations, after the final color has been determined for each pixel in the image and before the image has been rendered, the system applies a color mapping function to the final color to prepare the image for display. For example, the color mapping function may be a gamma function or a LUT (look-up table) transformation, contrast or brightness enhancing operation, CDL transformation, and so on. Further, in some implementations, the system may be configured to not actually apply the color transformation to the final image, but only to perform the sampling as though the color transformation is applied, e.g., in case some additional post-processing is performed where the original linear pixel values are needed.

Figure 3:
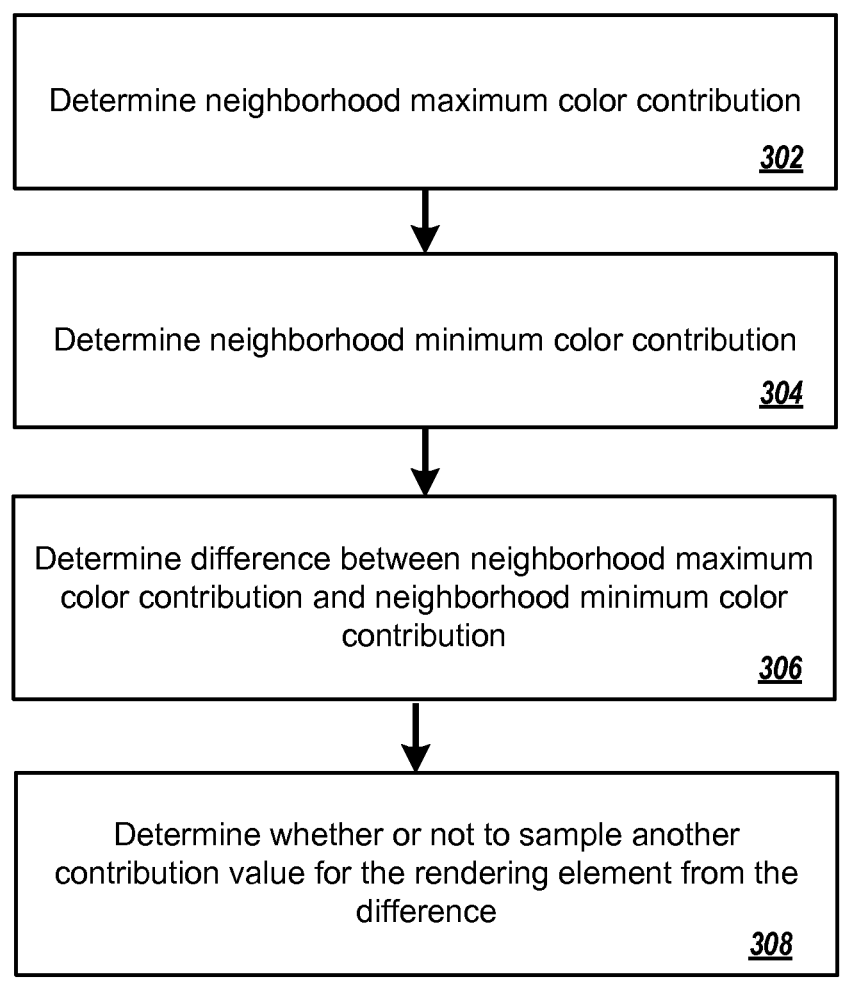
FIG. 3 is a flow diagram of an example technique for determining whether or not to sample another contribution value for a given render element for a given pixel of an image.

FIG. 3 is a flow diagram of an example technique 300 for determining whether or not to sample another contribution value for a given render element for a given pixel of an image. For convenience, the technique 300 will be described as being performed by a system of one or more data processing apparatus located in one or more locations. For example, a rendering system, e.g., the rendering system 100 of FIG. 1, appropriately programmed, can perform the technique 300.

The system determines a neighborhood maximum color contribution value for the render element from the current color data maintained for the render element (step 302). That is, in this example, the current color data that is maintained for a given render element for a given pixel includes the maximum of the color contribution values that have been sampled for the render element for the pixel. The system uses the maintained maximum color contribution values to determine the neighborhood maximum color contribution value for the render element. In particular, the neighborhood maximum color contribution value for the render element is the highest maximum color contribution value for the render element among the maximum color contribution values for the pixel and the one or more pixels that neighbor the pixel in the image.

The system determines a neighborhood minimum color contribution value for the render element from the current color data maintained for the render element (step 304). That is, in this example, the current color data that is maintained for a given render element for a given pixel includes the minimum of the color contribution values that have been sampled for the render element for the pixel. The system uses the maintained minimum color contribution values to determine the neighborhood maximum color contribution value for the render element. In particular, the neighborhood minimum color contribution is the lowest minimum color contribution value for the render element among the minimum color contribution values for the pixel and the one or more pixels that neighbor the pixel in the image.

The system determines a difference between the neighborhood maximum color contribution value and the neighborhood minimum color contribution value (step 306) and determines whether or not to sample another contribution value for the render element from the difference (step 308).

In some implementations, the system computes a ratio between the difference and a value derived from the total number of color contribution values that have been sampled for the render element for the pixel. For example, the value derived from the total number can be the total number, the total number plus a constant value, e.g., 1, 5, or 10, or the total number raised to a constant power, e.g., 1.1, 1.5, or 2. If the ratio exceeds a specified threshold value, the system determines not to sample another contribution value for the render element. If the ratio does not exceed the specified threshold value, the system determines to sample another contribution value for the render element.

In some other implementations, as described above, when the final color has been determined for each pixel in the image, the system applies a color mapping function to the final color as part of the rendering process. In these implementations, instead of computing the ratio of the difference and the value derived from total number of color contribution values directly, the system first computes, for each render element, the average color contribution values sampled for the render element for the pixel and then sums the average color contribution values, i.e., determines the current value for the final color if no additional contribution values needed to be sampled for any of the render elements. The system then computes a product between the difference and a value of the derivative of the color mapping function at the sum of the average color contribution values. The system then computes the ratio between the product and the value derived from total number of color contribution values and compares the ratio to the specified threshold value to determine whether or not to sample another contribution value for the render element.

Figure 4:
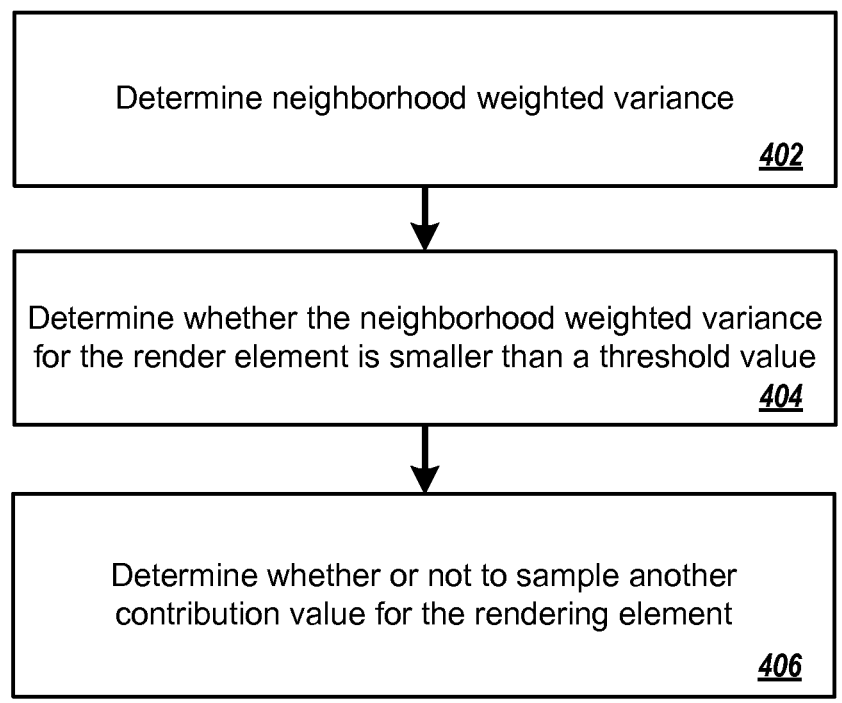
FIG. 4 is a flow diagram of another example technique for determining whether or not to sample another contribution value for a given render element for a given pixel of an image.

FIG. 4 is a flow diagram of another example technique 400 for determining whether or not to sample another contribution value for a given render element for a given pixel of an image. For convenience, the technique 400 will be described as being performed by a system of one or more data processing apparatus located in one or more locations. For example, a rendering system, e.g., the rendering system 100 of FIG. 1, appropriately programmed, can perform the technique 400.

The system determines a neighborhood weighted variance for the render element from the current color data maintained for the render element (step 402). That is, in this example, for each pixel the current color data maintained for each render element includes the variance of the color contribution values that have been sampled for the render element. The system determines the neighborhood weighted variance for the render element from the variance maintained in the color data for the given pixel and the one or more pixels that neighbor the pixel in the image.

In particular, in some implementations, for the given pixel and for each of the one or more neighboring pixels, the system multiplies the variance for the render element for the pixel by the number of samples that have been sampled for the render element in the pixel to determine a variance sum for the pixel. The system then sums the variance sums for the given pixel and the one or more neighboring pixels to determine a neighborhood variance sum and divides the neighborhood variance sum by the total number of samples for the render elements among the given pixel and the neighboring pixels to determine the neighborhood weighted variance.

In some other implementations, the system computes, for the given pixel and for each neighboring pixel, the average color contribution values sampled for the render element for the pixel and then sums the average color contribution values, i.e., determines the current value for the final color if no additional contribution values needed to be sampled for any of the render elements. The system then applies a color mapping function to the final color to determine a mapped color for the pixel and uses the mapped final color and the final color in determining the neighborhood weighted variance. In particular, for the given pixel and each of the one or more neighboring pixels, the system adjusts the variance sum for the pixel using the mapped final color and the final color to generate an adjusted variance sum. The system then sums the adjusted variance sums for the given pixel and the one or more neighboring pixels to determine a neighborhood variance sum and divides the neighborhood variance sum by the total number of samples for the render elements among the given pixel and the neighboring pixels to determine the neighborhood weighted variance. In some implementations, the system determines the adjusted variance sum for each pixel by multiplying the variance sum for the pixel by the mapped final color for the pixel and dividing by the square of the final color for the pixel.

The system determines whether the neighborhood weighted variance for the render element is smaller than a threshold value (step 404) and determines whether or not to sample another contribution value for the render element based on whether the neighborhood weighted variance for the render element is smaller than the threshold value (step 406). That is, the system determines not to sample another contribution value when the difference is less than the threshold value and determines to sample another contribution value when the difference is greater than or equal to the threshold value.

Figure 5:
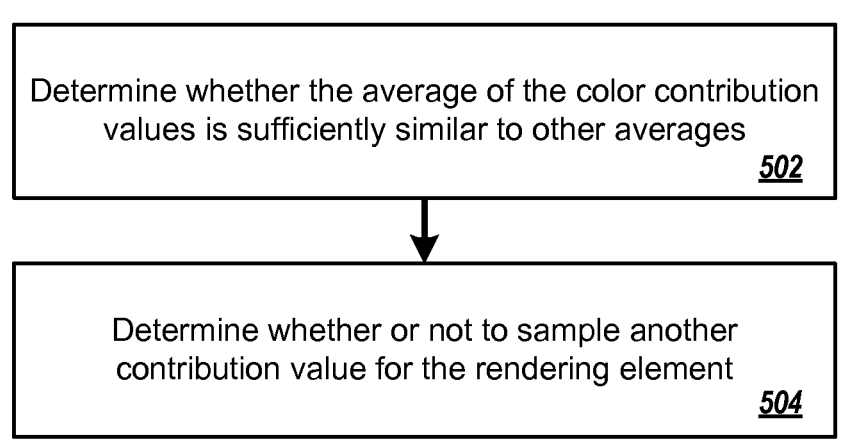
FIG. 5 is a flow diagram of yet another example technique for determining whether or not to sample another contribution value for a given render element for a given pixel of an image.

FIG. 5 is a flow diagram of yet another example technique 500 for determining whether or not to sample another contribution value for a given render element for a given pixel of an image. For convenience, the technique 500 will be described as being performed by a system of one or more data processing apparatus located in one or more locations. For example, a rendering system, e.g., the rendering system 100 of FIG. 1, appropriately programmed, can perform the technique 500.

The system determines whether the average of the color contribution values that have been sampled for the given render element for the given pixel is sufficiently similar to the averages of the color contribution values for the one or more pixels that neighbor the given pixel in the image (step 502). In some implementations, the system determines that the average for the given pixel is sufficiently similar when the average for the given pixel is within a threshold value of an average of the average color contribution values for the one or more pixels that neighbor the given pixel. In some other implementations, the system determines that the average for the given pixel is sufficiently similar when the average for the given pixel is within a threshold value of the average color contribution value for each of the one or more pixels, i.e., when no neighboring pixel has an average color contribution value that differs from the average color contribution value for the given pixel by more than the threshold value.

The system determines whether or not to sample another contribution value for the render element based on whether the average of the color contribution values that have been sampled for the given render element for the given pixel are sufficiently similar to the averages of the color contribution values for the one or more pixels that neighbor the given pixel in the image (step 504). That is, the system determines not to sample another contribution value when the average for the given pixel is sufficiently similar and determines to sample another contribution value when the average for the given pixel is not sufficiently similar.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media.

The operations described in this specification can be implemented as operations performed by a data processing apparatus on data stored on one or more computer-readable storage devices or received from other sources. The term "data processing apparatus" encompasses all kinds of apparatus, devices, and machines for processing data, including by way of example a programmable processor, a computer, a system on a chip, or multiple ones, or combinations, of the foregoing. The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, e.g., web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data. However, a computer need not have such devices. Moreover, a computer can be embedded in another device, e.g., a mobile telephone, a smart phone, a mobile audio or video player, a game console, a Global Positioning System (GPS) receiver, and a wearable computer device, to name just a few. Devices suitable for storing computer program instructions and data include all forms of non-volatile memory, media and memory devices, including by way of example semiconductor memory devices, magnetic disks, and the like. The processor and the memory can be supplemented by, or incorporated in, special purpose logic circuitry.

To provide for interaction with a user, embodiments of the subject matter described in this specification can be implemented on a computer having a display device for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input and output.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method performed by one or more computers for rendering an image, comprising:
   determining a respective final color value for each of a plurality of pixels of the image, comprising:
      maintaining current color data for each of a plurality of render elements generated by sampling color contribution values for the render element for the pixel, wherein each of the plurality of render elements represents a contribution of a respective type of color calculation to the final color value for the pixel, and wherein the current color data for each of the plurality of render elements comprises a measure of statistical variance of the color contribution values sampled for the render element;
      determining, for each of the plurality of render elements, whether or not to sample another color contribution value for the render element from the current color data for the render element for the pixel and the current color data for the render element for one or more pixels that neighbor the pixel in the image, including:
         determining a neighborhood weighted variance from the measure of statistical variance for the render element for the pixel and for the one or more pixels that neighbor the pixel in the image,
         determining whether or not the neighborhood weighted variance is smaller than a threshold value, and
         determining whether or not to sample another color contribution value for the render element based on whether or not the neighborhood weighted variance is smaller than the threshold value; and
      in response to determining to sample another color contribution value for one or more render elements of the plurality of render elements while determining not to sample another color contribution value for one or more other render elements of the plurality of render elements, sampling a new color contribution value only for the one or more render elements for which it was determined to sample another contribution value and refraining from sampling a new color contribution value for the one or more other render elements for which it was determined not to sample another contribution value; and
   rendering the image for display based on the respective final color values for the plurality of pixels.

2. The method of claim 1, wherein determining the respective final color value for each of the plurality of pixels further comprises:
   updating the current color data for the render elements for which a new color contribution value was sampled to generate updated color data.

3. The method of claim 2, wherein determining the respective final color value for each of the plurality of pixels further comprises, for a first pixel of the plurality of pixels of the image:
   determining, from the updated color data for the render elements for the first pixel, not to sample another color contribution value for any of the render elements for the first pixel; and
   determining the final color for the first pixel based on determining not to sample another color contribution value for any of the render elements for the first pixel.

4. The method of claim 3, wherein determining the final color for the first pixel comprises determining a sum of average color contribution values sampled for the render elements for the pixel.

5. The method of claim 1, wherein the render elements include one or more of direct illumination, reflection, global illumination, refraction or volumetric effects.

6. A system comprising one or more computers and one or more storage devices storing instructions that when executed by the one or more computers cause the one or more computers to perform operations for rendering an image, the operations comprising:
   determining a respective final color value for each of a plurality of pixels of the image, comprising:
      maintaining current color data for each of a plurality of render elements generated by sampling color contribution values for the render element for the pixel, wherein each of the plurality of render elements represents a contribution of a respective type of color calculation to the final color value for the pixel, and wherein the current color data for each of the plurality of render elements comprises a measure of statistical variance of the color contribution values sampled for the render element;

determining, for each of the plurality of render elements, whether or not to sample another color contribution value for the render element from the current color data for the render element for the pixel and the current color data for the render element for one or more pixels that neighbor the pixel in the image, including:

determining a neighborhood weighted variance from the measure of statistical variance for the render element for the pixel and for the one or more pixels that neighbor the pixel in the image, determining whether or not the neighborhood weighted variance is smaller than a threshold value, and determining whether or not to sample another color contribution value for the render element based on whether or not the neighborhood weighted variance is smaller than the threshold value; and in response to determining to sample another color contribution value for one or more render elements of the plurality of render elements while determining not to sample another color contribution value for one or more other render elements of the plurality of render elements, sampling a new color contribution value only for the one or more render elements for which it was determined to sample another contribution value and refraining from sampling a new color contribution value for the one or more other render elements for which it was determined not to sample another contribution value; and rendering the image for display based on the respective final color values for the plurality of pixels.

7. The system of claim 6, wherein determining the respective final color value for each of the plurality of pixels further comprises:

updating the current color data for the render elements for which a new color contribution value was sampled to generate updated color data.

8. The system of claim 7, wherein determining the respective final color value for each of the plurality of pixels further comprises, for a first pixel of the plurality of pixels of the image:

determining, from the updated color data for the render elements for the first pixel, not to sample another color contribution value for any of the render elements for the first pixel; and determining the final color for the first pixel based on determining not to sample another color contribution value for any of the render elements for the first pixel.

9. The system of claim 8, wherein determining the final color for the first pixel comprises determining a sum of average color contribution values sampled for the render elements for the pixel.

10. The system of claim 6, wherein the render elements include one or more of direct illumination, reflection, global illumination, refraction, or volumetric effects.

11. A computer program product encoded on one or more non-transitory computer storage media, the computer program product comprising instructions that when executed by one or more computers cause the one or more computers to perform operations for rendering an image, the operations comprising:

determining a respective final color value for each of a plurality of pixels of the image, comprising:

maintaining current color data for each of a plurality of render elements generated by sampling color contribution values for the render element for the pixel, wherein each of the plurality of render elements represents a contribution of a respective type of color calculation to the final color value for the pixel, and wherein the current color data for each of the plurality of render elements comprises a measure of statistical variance of the color contribution values sampled for the render element;

determining, for each of the plurality of render elements, whether or not to sample another color contribution value for the render element from the current color data for the render element for the pixel and the current color data for the render element for one or more pixels that neighbor the pixel in the image, including:

determining a neighborhood weighted variance from the measure of statistical variance for the render element for the pixel and for the one or more pixels that neighbor the pixel in the image, determining whether or not the neighborhood weighted variance is smaller than a threshold value, and determining whether or not to sample another color contribution value for the render element based on whether or not the neighborhood weighted variance is smaller than the threshold value; and in response to determining to sample another color contribution value for one or more render elements of the plurality of render elements while determining not to sample another color contribution value for one or more other render elements of the plurality of render elements, sampling a new color contribution value only for the one or more render elements for which it was determined to sample another contribution value and refraining from sampling a new color contribution value for the one or more other render elements for which it was determined not to sample another contribution value; and rendering the image for display based on the respective final color values for the plurality of pixels.

12. The computer program product of claim 11, wherein determining the respective final color value for each of the plurality of pixels further comprises:

updating the current color data for the render elements for which a new color contribution value was sampled to generate updated color data.

13. The computer program product of claim 12, wherein determining the respective final color value for each of the plurality of pixels further comprises, for a first pixel of the plurality of pixels of the image:

determining, from the updated color data for the render elements for the first pixel, not to sample another color contribution value for any of the render elements for the first pixel; and determining the final color for the first pixel based on determining not to sample another color contribution value for any of the render elements for the first pixel.

14. The computer program product of claim 13, wherein determining the final color for the first pixel comprises determining a sum of average color contribution values sampled for the render elements for the pixel.

15. The computer program product of claim 11, wherein the render elements include one or more of direct illumination, reflection, global illumination, refraction, or volumetric effects.

* * * * *